(12) United States Patent
Nishigaki (10) Patent No.: US 6,776,931 B2
(45) Date of Patent: Aug. 17, 2004

(54) METHOD FOR PRODUCING LIGHT TRANSMITTING PLATE

(75) Inventor: Yoshiki Nishigaki, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 378 days.

(21) Appl. No.: 09/840,270

(22) Filed: Apr. 24, 2001

(65) Prior Publication Data

US 2002/0024158 A1 Feb. 28, 2002

(30) Foreign Application Priority Data

Apr. 28, 2000 (JP) ........................................ 2000-130339
May 26, 2000 (JP) ........................................ 2000-156887

(51) Int. Cl.[7] .............................................. B29D 11/00
(52) U.S. Cl. .......................... 264/1.1; 264/1.9; 264/2.5
(58) Field of Search ........................... 264/1.1, 1.7, 1.9, 264/2.5; 425/808

(56) References Cited

U.S. PATENT DOCUMENTS 6,132,652 A * 10/2000 Higuchi et al.

6,497,939 B1 * 12/2002 Obuchi et al.

FOREIGN PATENT DOCUMENTS

JP 06-210685 8/1994
JP 11-309761 11/1999

* cited by examiner

Primary Examiner—Mathieu D. Vargot
(74) Attorney, Agent, or Firm—Sughrue Mion, PLLC (57) ABSTRACT

The present invention provides a method for producing a light transmitting plate, comprising the steps of: using a molding equipment composed of an injection equipment and a mold for producing a light transmitting plate wherein a cavity of the mold communicates with a cylinder in the injection equipment; feeding a transparent resin into the cylinder; melting the transparent resin in the cylinder; and injecting the molten resin into the cavity of the mold from the cylinder; wherein a viscosity of the molten resin at the inlet of the mold is about 50 to about 5,000 Pa·sec and an injection rate is about 1 to about 15 $cm^3$/sec, which method can be produce excellent light transmitting plate, specially large-size ones, further ones with a reflection layer pattern or a light diffusion pattern transferred, in transparency and dimensional stability.

16 Claims, 3 Drawing Sheets

METHOD FOR PRODUCING LIGHT TRANSMITTING PLATE

BACKGROUND OF THE INVENTION

1. Technical Field of the Invention

The present invention relates to a method for producing light transmitting plate. More specifically, the present invention relates to a method for producing a large-sized light transmitting plate having a diagonal length of not less than 14 inches too.

2. Description of Related Art

Light transmitting plates are used as an optical element for transmitting light from light source(s) provided on the lateral sides thereof in a liquid crystal display for note-book type personal computers, desk top personal computers, television set with a liquid crystal display, etc. Arrangements of a liquid crystal display and light transmitting plates are shown in a schematic sectional view in FIG. 1. A back light unit provided in the rear side of liquid crystal display 1 is composed mainly of alight transmitting plate 2 or 3, a reflection layer 4 placed in the rear side of light transmitting plate 2 or 3, a light diffusion layer 5 facing the light transmitting plates 2 or 3 (facing the liquid crystal display), a light source 7 placed on the lateral sides of the light transmitting plate 2 or 3 and a reflector 8 for transmitting light from the light source into the light transmitting plate 2 or 3. The incident light beams from the light source 7 are reflected on the surface of the reflector 8 and enters into the light transmitting plates 2, 3 and, while passing therethrough, are reflected by the reflection layer 4 and emitted out of the front side. On the front side of the plate, light are emitted uniformly from the whole area due to the presence of the light diffusion layer 5 and serves as illumination for the liquid crystal display 1. A cold cathode-ray tube is generally used as the light source 7.

Figure 1:
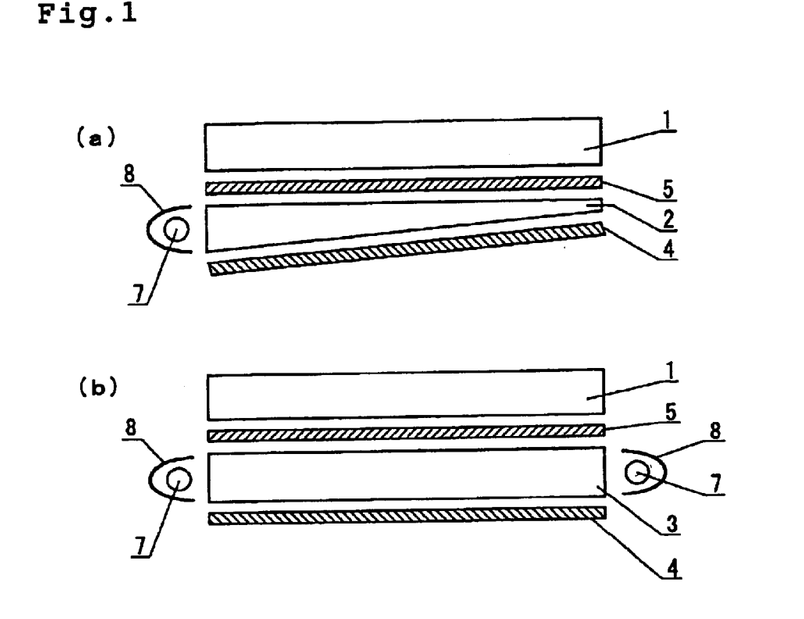
FIG. 1 is a schematic sectional view showing an arrangement of a liquid crystal display and a light transmitting plate, and (a) is an example using a wedge-shaped light transmitting plate and (b) is an example using a sheet-formed light transmitting plate.

As the reflection layer 4, a reflection plate may be used. Alternatively, a pattern having a reflective function may be printed on the rear side of the light transmitting plates 2 or 3 providing the same function. As the light diffusion layer 5, a light diffusion plate may be used. Alternatively, a pattern having a light diffusion function may be printed on the front side of the light transmitting plate 2 or 3 to afford the same diffusion effect as above. Also, an application of a prism sheet as a light diffusion layer is well known.

FIG. 1 (a) shows an arrangement of a liquid crystal display and a light transmitting plate used in relatively small-sized displays with a diagonal length of not larger than about 14 inches for note-book type personal computers etc. The light transmitting plate 2 is in a shape of a wedge with the thickness gradually increasing from about 0.6 mm to about 3.5 mm. In a light transmitting plate 2 in the shape of a wedge, the light source 7 is placed at the thicker end of the plate 2. In the example shown FIG. 1 (a), one light source 7 is placed. Instead, a plural of light sources may be used. The arrangement shown in FIG. 1 (b), on the other hand, is for large-sized display in desk-top personal computer, television set with a liquid crystal display, etc. The light transmitting plate 3 is in the form of a sheet with an almost uniform thickness. In such a sheet-formed light transmitting plate 3, light sources 7, 7 are placed on two opposed lateral sides respectively. In the example shown in FIG. 1 (b), two light sources 7, 7 are placed, on each of lateral side respectively. Instead, a plurality of light sources 7,7, that is, two, three or more light sources may be disposed on each lateral side for still larger displays.

Such light transmitting plates 2, 3 are made of a methacrylate resin with a high light transmittance. The light transmitting plate 2 in the form of a wedge as shown in FIG. 1 (a) is made by injection molding while the light transmitting plate 3 in the form of a sheet as shown in FIG. 1 (b) is cut out from a resin sheet. Attempts have been made to make a light transmitting plate without printing. That is, in case of a light transmitting plate 2, which is made by injection molding, such patterns as dots or lines are added on the surface of the mold so as to form the patterns on the surface of a molded light transmitting plate that serves as reflection layer. Furthermore, this technique is applied to form the front, on a light emission surface as well, through forming a pattern with light diffusion and light orientation capabilities so as to eliminate the use of a diffusion plate or prism sheet.

A known injection molding process will be explained briefly. The injection molding equipment used includes a mold, a clamping device to drive the mold toward clamping or closing directions and an injection equipment to inject a molten resin into the mold. The mold is made up of a movable plate(s) and a stationary plate(s). In the stationary plate(s), a sprue is formed through which a molten resin is passed. A runner and gate are formed along the parting line between the movable plate(s) and the stationary plate(s), and a cavity for molding a product is formed between the movable and stationary plates. The movable plate(s) is provided with ejection means for taking out a molded product. The injection equipment is to plasticize and melt a resinous material and inject and fill the molten material into the mold cavity swiftly. The injection equipment includes a cylinder, a screw so provided therein as to be progressed by rotation and driven, a nozzle mounted at the tip of the cylinder, a hopper to feed the material resin into the cylinder, a motor to drive the screw, and a ram mechanism to drive the screw forward.

The circumferential portion of the cylinder is provided with a heater to melt the resin inside. Driven by the motor, the screw feeds the resin into the cylinder. With the heater energized, the resin is heated and compressed, and melted and kneaded, then sent to the tip of the screw and accumulated there. Then by the ram mechanism, the screw is driven forward with no rotation so as to inject the molten resin into the cavity of the mold through the nozzle at a stroke. Thus, a molded product is obtained. In the usual injection molding, the injection rate is about 20 to about 300 $cm^3/sec$.

A series of steps to obtain a molded product comprises feeding the measured amount of resin into the cylinder, accumulating a predetermined quantity of molten resin at the tip of the cylinder, injecting and filling the molten resin into the cavity by moving the screw forward, applying an additional holding pressure to compensate for volume shrinkage caused by cooling and solidification of the molten resin, followed by cooling the molded product within the mold and measuring the molten resin for successive molding operation, moving the movable components and opening the mold to take out the molded product after cooling.

To make a light transmitting plate with a diagonal length of not less than 14 inches by above described injection molding process, it becomes necessary to utilize a larger molding equipment than usual having corresponding higher clamping strength. Further, as the product size becomes larger, the distance from the molding gate to the flowing peripheries increases and an accurate molding becomes difficult That is, in the known injection molding, a short-shot (areas where the resin failed to reach) occurs. Though volume shrinkage of molten material upon cooling which is generally compensated by holding pressure, the compensation for the pressure depression does not work effectively when the material flow paths are distant from the gate, and consequently sink marks (sunk areas caused by volume shrinkage) or inaccurately transferred patterns by the inner surface of the wall of the cavity are observed on the surface of the molded product. It is difficult, therefore, to obtain uniform light transmitting plate and since the light beams irradiated from the cold cathode-ray tube as a light source fails to cover the whole area of the plate with a sufficient luminous intensity, a large-sized light transmitting plate having a diagonal length of not less than 14 inches with even thickness has not been manufactured for practical application by the injection molding process, but been made by cutting a sheet of methacrylic resins.

In other words, a light transmitting plate having a diagonal length of not less than 14 inches and still larger ones having a diagonal length of 15 inches or more are made by cutting out a uniform methacrylate resin sheet to a desired size, and a total of two, four or six cold cathode-ray tubes are disposed on the both lateral sides respectively as back light sources. Methacrylate resin sheets of about 5 to about 15 mm thick are used. In this method, the methacrylate resin sheet is first roughly cut, and then subjected to a finishing cut by means of laser-cutting process which also includes finishes of the end portions. A reflection pattern is then printed on one side of the sheet to obtain a finished product.

A problem raised by the above described cutting out method is that the sheet of methacrylate resin lacks high degree of precision in thickness and this may cause uneven printing of patterns on the surface of the sheet, and possible occurrence of open spaces between cut out sheets and frames of the product plate or fitting failure may be encountered. In the laser cutting process, furthermore, edge portions of the sheet tends to droop due to heat generated by laser beams utilized and this may lead to product failure. In addition, the printing costs in the subsequent procedure are high. The conventional method presents such problems that would not have been encountered if the light transmitting plate were made by injection molding process. Meanwhile, large light transmitting plate having a diagonal length of not less than 14 inches are not readily made by injection molding without blemish. It is also not easy to transfer desired patterns providing functions such as reflection and diffusion of light onto the surface of molded resinous product during its stay in the mold cavity due to unusual product size and inherent inferior transferability.

In view of the prior art described above, including the disadvantages and deficiencies of the prior art, the inventors conducted intensive research and succeeded in finding a method for producing a light transmitting plate, especially larger ones with a diagonal length of not less than 14 inches (355 mm), which are molded from a molten resin and which are uniform in thickness and fully meet the requirements of light transmitting plates and can configure a reflection layer pattern or light diffusion layer pattern concurrently.

SUMMARY OF THE INVENTION

It is, therefore, an object of the present invention to produce light transmitting plates including larger ones having a diagonal length of not less than 14 inches by molding from a molten resin, the plate being excellent in thickness uniformity, dimensional stability, overall production costs in a method which also forms a pattern to serve as a reflection layer or a light diffusion layer on the emission side so that the subsequent printing procedure can be eliminated.

That is, the present invention provides a method for producing a light transmitting plate, comprising the steps of:

using a molding equipment composed of an injection equipment and a mold for producing a light transmitting plate wherein a cavity of the mold communicates with a cylinder in the injection equipment;

feeding a transparent resin into the cylinder;

melting the transparent resin in the cylinder; and injecting the molten resin into the cavity of the mold from the cylinder;

wherein a viscosity of the molten resin at the inlet of the mold is about 50 to about 5,000 Pa·sec and an injection rate of the molten resin is about 1 to about 15 $cm^3$/sec.

Also, according to the method of the present invention, it is possible to produce a light transmitting plate with high precision using a mold with functional pattern(s) provided on at least one of the surface. The resulting light transmitting plate obtained has a pattern transferred on at least one side of the surface thereof; a reflection layer pattern on the rear side thereof or a light diffusion pattern on the light emission side. Those patterns are configured based on a concave/convex pattern on the surface of the mold.

In the method of the present invention, the screw is driven forward in the cylinder or the screw is rotated to cause the molten resin continuously to flow into the mold cavity at a very low velocity to mold the resin. In the present invention, this mold method is adopted for making such light transmitting plate, especially for large ones. In this inventive method, an engraved pattern is provided at least on one cavity surface of the mold. According to this method, it is possible to mold a molten resin directly into an light transmitting plate that is excellent in thickness uniformity, dimensional stability and which is provided with a reflection layer or light diffusion layer pattern or both. That leads to reduction in overall manufacturing costs as well.

BRIEF DESCRIPTION OF THE DRAWINGS

Preferred embodiments of the present invention will be illustrated in conjunction with the accompanying drawings, in which.

DESCRIPTION OF THE PREFERRED EMBODIMENTS

Any transparent resin can be used according to the present invention as long as it satisfies the properties required in the light transmitting plate. The examples of such resins include thermoplastic resins that can be melted and molded such as methacrylate resin, polycarbonate, polystyrene, MS resin which is a copolymer of methyl methacrylate and styrene, amorphous cyclo-olefin polymer, polypropylene, polyethylene, high-density polyethylene, ABS resin which is a copolymer of acrylonitrile and butadiene, polysulfone resin, and thermoplastic polyester resin. The methacrylate resin is a polymer based on methyl methacrylate. In addition to a polymer of methacrylate alone, copolymers of methyl acrylate and a small quantity of up to 10% by weight monomers may be used, for example copolymers of methyl methacrylate and alkylacrylates such as methyl acrylate and ethyl acrylate. Also, those resins may be mixed with a releasing agent, ultraviolet light absorber, pigment, polymerization inhibitor, chain transfer agent, antioxidant, flame retardant etc. as necessary.

Such transparent resin material are fed into the cylinder and melted. This molten resin is injected within the mold cavity at a very low velocity, that is, at an injection rate of about 1 to about 15 cm$^3$/sec., preferably about 4 to about 11 cm$^3$/sec. The injection rate used herein means the average velocity of injecting the resin to be filled into the mold cavity from the initiation of injecting to the end of filling. The injection rate can be worked out by dividing the product volume (cm$^3$) by the time required for filling the molten resin. The product volume can be obtained from the weight of the product and the specific gravity of the resin. In the conventional injection molding methods, the injection rate is at least about 20 cm$^3$/sec. as mentioned above.

Too low injection rate tends to result in a short shot, poor appearance such as flow mark (flowing marks on the surface), thickness unevenness and poor dimensional precision. If, on the other hand, the injection rate is too high, that can cause shrinking or result in poor thickness unevenness or poor dimensional precision. Even if the same mold is used, the weight of the product will be different depending on the rate at which the molten resin is fed into the cavity, that is, the filling time. The optimum injection rate can be determined by simple preliminary testing.

It is also pointed out that the viscosity of the molten resin is an important parameter to obtain a uniform light transmitting plate with no sink mark. The viscosity of the molten resin at the inlet of the mold is so adjusted as to be about 50 to about 5,000 Pa·sec, preferably about 200 to about 1000 Pa·sec. It is desirable that the viscosity of the molten resin is low in view of molding capability. To lower the viscosity could mean to raise the temperature of the molten resin excessively or to increase injection rate. For this reason, the lower limit is about 50 Pa·sec. If, on the other hand, the viscosity of the molten resin is too high, the molten resin will solidify before reaching corner of the mold cavity. Therefore, the upper limit is about 5,000 Pa·sec.

The viscosity of the molten resin at the inlet of the mold can be worked out as follows.

First, the linear velocity is calculated from the injection rate (cm$^3$/sec) and the sectional area (CM$^2$) at the inlet of the mold by the equation given below. From the result and the thickness (cm) at the inlet of the mold, the shear rate (sec$^{-1}$) at the inlet of the mold is worked out in a simplified way.

[Linear velocity at mold inlet] (cm/sec)=[injection rate] (cm$^3$/sec)/[sectional area at mold inlet] (cm$^2$)

[Shear rate] (sec$^{-1}$)=[linear velocity] (cm/sec)/{[thickness of mold inlet]/2} (cm)

And the viscosity of the molten resin at the shear rate can be found by checking against data on the dependence on the shear rate of the viscosity of the resin picked out from a capilograph separately.

The molding equipment used for the method of the present invention is almost the same as the ordinary injection molding equipment in construction. In one embodiment of the present invention, the molten resin is sent to the tip of the screw with rotation and accumulated there. Then by the ram mechanism, the screw is driven forward with no rotation so as to inject the molten resin into the cavity of the mold at a very low velocity. Since the resin is filled at a low velocity, the pressure applied to the mold (in-mold pressure) is lower than that in the ordinary injection molding. Even large-area products can be molded with a relatively low clamping force. It is noted that in case where the pressure of the injection equipment is insufficient as injection pressure is applied at a low velocity for a long time, an auxiliary pressure unit such as an accumulator may be added.

In another embodiment of the present invention, furthermore, the screw is progressed at the tip of the cylinder, and the transparent resin that is fed into the cylinder and melted is continuously fed into the mold cavity by rotation of the screw in the cylinder and is molded into a light transmitting plate. If a method is adopted in which the molten resin is continuously fed into the mold cavity by rotation of the screw in the cylinder, the possibility of interrupting the flow of the molten resin will be reduced, resulting an improved formability. When this method is adopted, the molten resin will be filled for injection under by continuous drive force derived from rotation of the screw. Therefore, it becomes possible to mold a product with a larger volume than the volume of cylinder by continuing the rotation of the screw. In addition, the pressure applied to the mold (in-mold pressure) is about half of that for the ordinary injection molding and therefore, large-area products can be molded with a low clamping force. The ordinary injection molding equipment can be used for the molding method of the present invention by remodeling the specifications of a ROM (read only memory) for driving the motor into the specifications suitable for the above method. Further, a combined method of a method in which the molten transparent resin is fed into the mold cavity by progressing the screw and a method in which the melted transparent resin is fed into the mold cavity by rotation of the screw, can be used for present invention by remodeling the specifications of a ROM (read only memory) for driving the motor. For example, a part of the molten resin is accumulated at the tip of the screw by rotation of the screw in the cylinder, the molten resin at the tip of the screw is injected into the cavity by progressing the screw with low speed with no rotation, successively the remaining molten resin is injected slowly into the cavity by rotation of the screw.

In the present invention, furthermore, it is also possible to use the mold, which has a concave/convex pattern such as dots and lines onto at least one surface of the mold, and transfer this pattern on the light transmitting plate. This pattern is transferred on the resin material filled into the cavity and serves as a reflection layer pattern to reflecting light toward the liquid crystal display the through the light transmitting plate or as a light diffusion pattern to diffuse the light in the front side of the light transmitting plate for emission. It is also possible to transfer patterns on each side, forming a reflection layer pattern on the incident light beam side and a light diffusion layer pattern on the light emission side concurrently.

The convex/concave pattern can be formed directly on the surface of inside wall of the mold cavity, but it is desirable to prepare a cavity plate with suitable pattern formed on the surface thereof and to insert and fix or paste it in the mold as it is easy to form a pattern or replace it with another pattern. This pattern can be formed using stamping method, sand blast method, etching method, laser and fraise fabrication technique, and electro-casting method. It is also noted that the pattern is designed by optical simulation etc. Any reflection layer pattern as substitute for printing will do as long as it is a pattern in which the pattern density and size are increased as the distance from the light source, which is the cold cathode-ray tube, increases so that the tip light can be diffused uniformly as a whole. Any material can be used for the cavity plate as long as it is suitable for forming the transferable pattern. And it is desirable that the cavity plate is as thin as possible.

Furthermore, the resin filled in the mold cavity is kept warm or cooled through this cavity surface. Therefore, the heat transfer of the molded resin depends on the thermal conductivity of the cavity surface. When this consideration is taken into account, it is desirable that the material of the surface of the walls of the mold cavity is a metal with a high thermal conductivity than that of a metal (usually, steel) forming the body of the mold. Copper or its alloys, for example, are desirable. Especially, it is desirable to use beryllium-copper alloy, that is, a copper alloy containing 0.3 to 3% by weight of beryllium. This alloy is about 3 to 6 times as high as ordinary steels in thermal conductivity. Furthermore, when such a cavity surface (which contacts with the molded product) is to be made mirror-smooth, plating is an effective mean for improving the mirror smoothness and mold releasing property as well. Suitable materials for the plating layer include titanium carbide (TiC), titanium nitride carbide (TiCN), titanium nitride (TiN), tungsten carbide ($W_2C$), chromium (Cr) and nickel (Ni). In addition, polishing after plating is useful.

In the method of the present invention, the rate at which the molten resin is injected is very low as compared with the ordinary injection molding, and therefore, even if an attempt is made to transfer pattern(s) on the resin surface merely by natural heat dissipation of the molten resin through walls of the mold, the pattern transfer will not always be satisfactory. In the present invention, therefore, it is desirable that the resin material is injected into the cavity with a temperature of surface of the wall(s) of the mold cavity being not lower than the glass transition temperature of the resin. After filling, the temperature of the cavity wall surface is allowed to fall under the glass transition temperature of the resin. Such a temperature control of the resin injected into the cavity is preferable to precisely transfer pattern(s) on the surface of the resin product. Practically, for instance, a passageway for a heating medium is provided within the mold wall and near the mold surface so as to circulate a heating medium and a cooling medium alternatively. That is, by utilizing a technique for adjusting the temperature by what is called the heating medium/cooling medium exchange method, it is possible to apply a method in which cooling-heating cycle molding can be carried out. Machine oil, water etc. are used as heating and cooling medium as well. A water-based medium is preferable. For example, water as a cooling medium and compressed water as a heating medium. In such a cooling-heating cycle molding, when a cavity plate made of beryllium-copper alloy is used, for example, it is possible to raise or lower the temperature in a short time which is almost half of the time needed when an ordinary steel plate is used.

That is, it is possible to place the cavity plate, which comprises a metal with a high thermal conductivity and is formed the convex/concave patterns thereon, on the walls in the cavity, and it is also possible to placing the cavity plate, which comprises a metal with a high thermal conductivity and is not formed the convex/concave patterns thereon, on the walls in the cavity, and to placing the plate, which comprises stainless steal and is formed the convex/concave patterns thereon, on the cavity plate.

To obtain a molded product which is transferred of a reflection layer pattern or a light diffusion pattern, a medium (heating medium) having a temperature of not lower than the glass transition temperature of the resin is first passed through the fluid passageways in the mold wall. When the surface temperature of the mold cavity has been raised around or above the glass transition temperature of the resin to be molded, the resin is fed into the cylinder and then the molten resin is injected and filled into the mold cavity. In an embodiment of the present invention in which the molten resin is fed into the mold cavity with a screw being rotated in the cylinder, feeding the resin into the cylinder by the rotational drive force of the screw and injecting and successively filling the molten resin into the mold cavity proceed concurrently. And when the molten resin is filled up to the periphery of the cavity inside the mold, a holding pressure is applied. Whenever the initiation of application of the holding pressure, at a certain time during pressure application or after termination of holding pressure application, the medium in the fluid passageway inside the mold wall is replaced with a medium at a temperature of not higher than the glass transition temperature, preferably a temperature not higher than thermal deflection temperature under load, to enter into the cooling step. Then, the mold is opened and the molded product is taken out.

Figure 2:
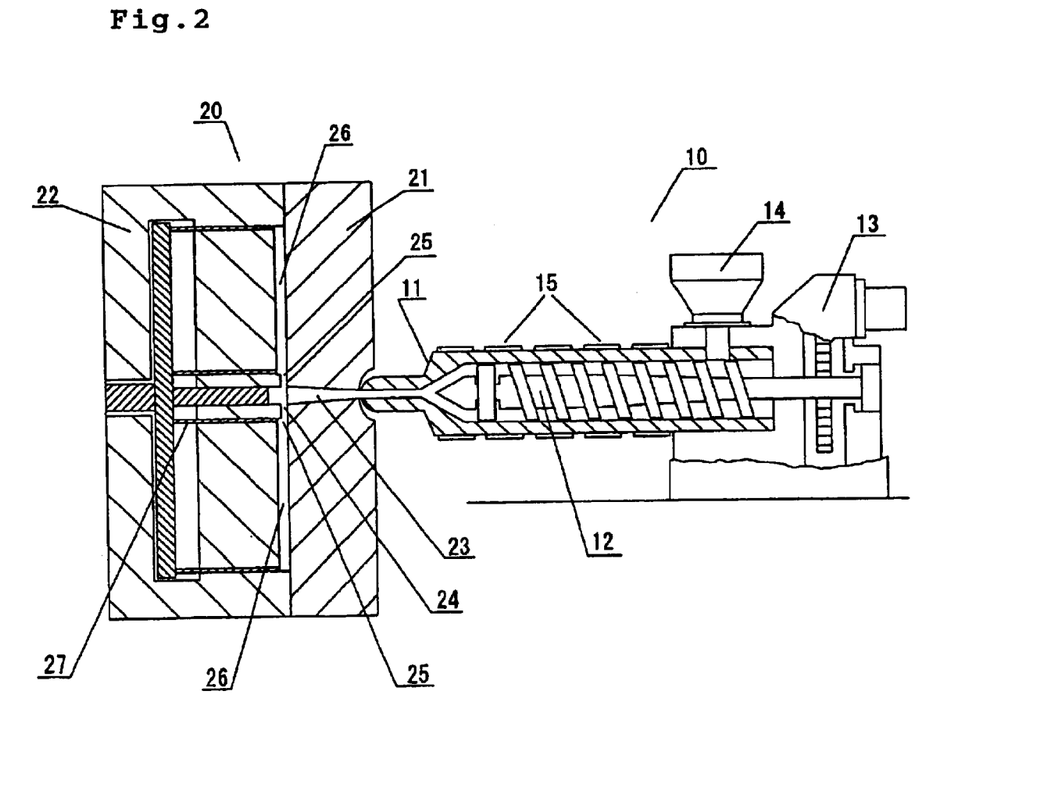
FIG. 2 is a schematic sectional view illustrating the molding equipment suitable for use in the present invention.

The molding method for a light transmitting plate having a mirror surface of the present invention will be explained with reference to FIG. 2. FIG. 2 is a sectional view schematically showing an example of the molding equipment suitable for the present invention. This molding equipment is made up of an injection equipment 10 and a mold 20. The injection equipment 10 includes an injection cylinder 11, a screw 12 which rotates and progresses in this cylinder, a motor 13 to drive the screw 12, a hopper 14 to feed the resin into the injection cylinder 11, heaters 15, 15 mounted on the outer surface of the injection cylinder 11.

Meanwhile, the mold 20 is formed of a stationary plate 21 and a movable plate 22. In the stationary plate 21, a sprue 23 is formed of which the sectional area is tapered toward the movable plate 22 and serves as passageway for molten resin. On the mating surface between the stationary plate 21 and the movable plate 22, a runner 24 is formed along the two plates 21, 22. The runner 24 communicates with the sprue 23 with the two ends leading to a gate 25. The stationary plate 21 and the movable plate 22 are mated to form cavities 26, 26 for molding light transmitting plates. With these cavities 26, 26, the gate 25 communicates. In this example, therefore, the cavities 26, 26 communicate with the injection cylinder 11 of the injection equipment 10 through the gate 25, the runner 24 and the sprue 23. Inside the movable plate 22, ejection means 27 is provided that ejects molded products when it is taken out. FIG. 2 shows an example in which two molded products can be made in one molding cycle. It may be so designed that one, three or more can be taken in one molding cycle.

Next, there will be explained about molding a light transmitting plate using the injection equipment 10 and the mold 20 shown in FIG. 2. With the screw 12 in the most forward position, the screw is rotated by an electric power of the motor 13 and at the same time the resin is fed into the injection cylinder 11 from the hopper 14. The fed resin is plasticized and kneaded by heat from the heaters 15, 15 and heat generating from shear and frictional force produced by the rotation of the screw 12 and is conveyed to the tip of the screw by rotational conveying action of the screw 12. The molten resin is then continuously injected into the cavity 26 through the sprue 23 and the gate 25. In this embodiment, the viscosity of the molten resin at the inlet of the mold is set at about 50 to about 5,000 Pa·sec and the injection rate of the molten resin is set at about 1 to about 15 cm³/sec, preferably about 4 to about 11 cm³/sec. And if the closed space of the cavity 26 is filled with the injected molten resin, the screw 12 is slightly moved back by the pressure of the filled resin. Then a suitable amount of back pressure is applied that allows the screw 12 to move back by the pressure of the resin. When the screw 12 moves backs to a specific extent, a suitable holding pressure is applied to make up for volume shrinkage of the molten resin to be cooled in the mold 20. And after the cooling step, the movable plate 22 is opened and a molded product is ejected by ejection means 27 and taken out. The way to take out the product is not limited to that ejection means, but any known method may be adopted. After the molded product is taken out, the movable plate 22 is closed and the next cycle to make a molded product is started.

Using such equipment, the movable plate 22 is first moved to the stationary plate 21 to close the mold, and the molten resin is injected into the closed cavity 26 formed by the two plates. The injection molding temperature (temperature of the resin in the injection cylinder) is set at about 170 to 300° C. For methyl methacrylate resin, a good molded body can be obtained with the temperature set at 190 to 270° C. Because the number of rotations of the screw determines the injection rate, the injection rate becomes higher as the number of rotations of the screw becomes higher. The number of rotations is generally 20 to 150 rpm depending on the thickness of molded product. The mold temperature is generally between 30 and 150° C. And when the cavity 26 is filled with the injected resin, the screw 12 is moved back to some extent by the resin pressure. When the screw 12 has moved back some distance, holding pressure is applied and maintained for some times. After the cooling step, the mold is opened to take out a molded product.

Figure 3:
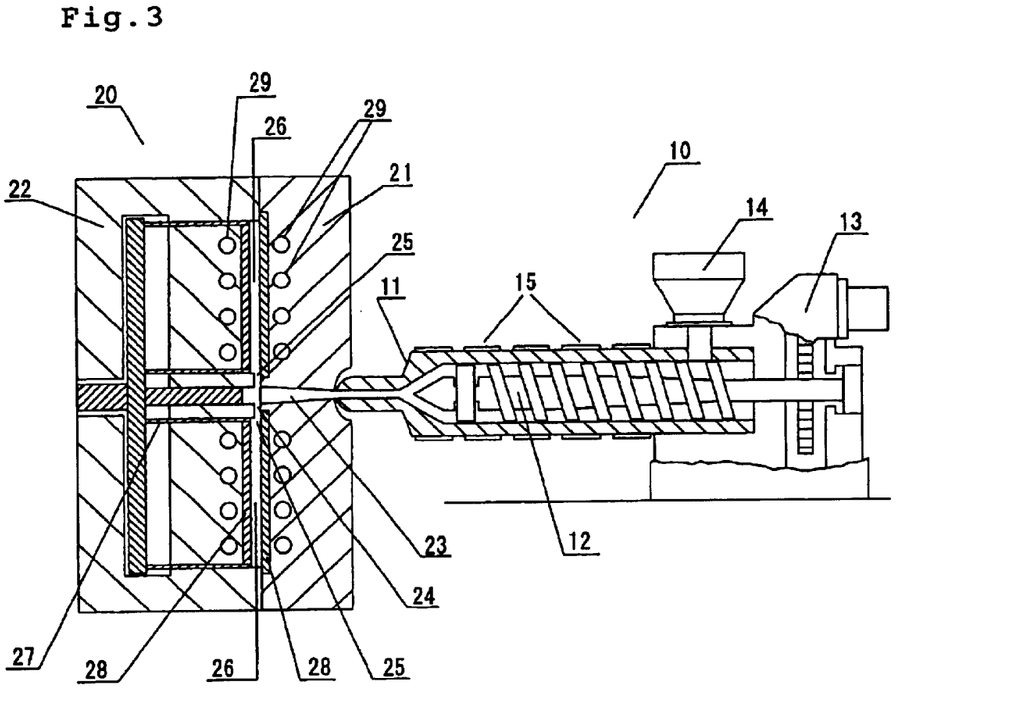
FIG. 3 is a schematic sectional view illustrating the molding equipment to transfer a pattern suitable for use in the present invention.

Next, the molding of a light transmitting plate with a reflection layer or light diffusion layer pattern transferred thereon will be explained with reference to FIG. 3.

In an injection equipment and mold similar to those in FIG. 2, the surface of the cavity 26 of the stationary plate 21 and the surface of the cavity 26 of the stationary plate 22 are formed by cavity plates 28, 28 for pattern transfer. Various engraved patterns are formed beforehand on the molding surface of either of or both of the cavity plates, which are inserted and fixed or pasted in the mold. As mentioned earlier, the cavity plates 28, 28 are made of preferably a material with a high thermal conductivity, for example, beryllium-copper alloy. Alternatively, a stainless steel plate with various patterns formed beforehand may be pasted on the cavity plate body made of beryllium-copper alloy. It is preferable that cavity plates 28, 28 are placed on the cavity surfaces of the stationary plate 21 and the movable plate 22. But in case an engraved pattern is to be placed on one surface in the cavity, the cavity plate 28 may be put on that surface only.

In the inner part of the stationary plate 21 and the movable plate 22, fluid passageways 29, 29 are provided to allow the heating medium and the cooling medium to flow. And it is so constructed that the mold temperature, to be exact the temperature of the cavity plates 28, 28 for pattern transfer is raised or lowered during the molding cycles by passing the heating medium and cooling medium alternately through the fluid passageways 29, 29 depending on the purpose by means of a temperature regulator provided in a control unit. It is desirable to provide the fluid passageways 29, 29 in both the stationary plate 21 and the movable plate 22. But the fluid passageways 29, 29 may be provided only on one side to allow the heating medium and the cooling medium to flow alternately, and reasonable results can be obtained.

Next, there will be explained a method of molding a light transmitting plate with a pattern transferred using the injection equipment 10 and the mold 20 shown in FIG. 3. In case the rotation force of the screw is not utilized in injecting the molten resin, the screw 12 is rotated by an electric power of the motor 13 and at the same time the resin is fed into the injection cylinder 11 from the hopper 14. The fed resin is plasticized and kneaded by heat generated by shearing and frictional force produced by the rotation of the screw 12 and progress to the tip of the screw by rotational conveying action of the screw 12. At the tip of the screw, a specific quantity of the resin is metered out. Then, the screw 12 with no rotation is slowly driven forward to inject the molten resin into the mold. The injected resin is continuously injected into the cavity 26 through the sprue 23 and the gate 25. In this embodiment, the viscosity of the molten resin at the inlet of the mold is set at about 50 to about 5,000 Pa·sec and the injection rate of the molten resin is set at about 1 to about 15 cm³/sec, preferably about 4 to about 11 cm³/sec.

On the other hand, in case where rotation of the screw is also utilized in injecting the molten resin, the screw 12, almost in the foremost position, is progressed by rotation and driven by the motor 13, and the resin is fed into the injection cylinder 11 from the hopper 14. The fed resin is plasticized and kneaded by heat from the heaters 15, 15 and heat generated by shearing and frictional force produced by the rotation of the screw 12 and conveyed to the tip of the screw by rotational conveying action of the screw 12. The injected resin is continuously injected into the cavity 26 through the sprue 23 and the gate 25. Then, a back pressure is applied to such an extent that the screw will not be moved back by the pressure of the resin being filled and will be moved back by the pressure of the filled resin.

In any embodiment, it is desirable that the mold temperature, to be exact the surface temperature on the cavity 26 side of the cavity plates 28, 28 for pattern transfer is set at not lower than the glass transition temperature of the resin to be molded. Considering the cycle, however, the temperature at the start of injection may be lower than that. But it is necessary to see that the surface temperature on the cavity 26 side of the cavity plates 28, 28 will be raised to not lower than the glass transition temperature at least before the next holding pressure step is initiated.

And when the closed space of the cavity 26 is filled with the molten resin, a suitable amount of holding pressure is applied so as to make up for volume shrinkage of the molten resin that is caused as it is cooled in the mold 20. In case the molten resin is continuously filled into the mold cavity with rotation of the screw in the cylinder, the screw 12 is slightly moved back by the pressure of the filled resin. When the screw 12 moves back some distance, holding pressure is applied. When the holding pressure is applied, the cooling medium is allowed to flow through the fluid passageways 29, 29. When the molded product cools down to an extent that it will not deform when taken out, the movable plate 22 is opened, and the molded product is ejected and taken out by ejection means 27. The way to take out the molded product is not limited to such an ejection means but any known method may be used. After the molded product is taken out, the medium in the fluid passageways 29, 29 is replaced with the heating medium so that the surface temperature on the cavity side of the cavity plates 28, 28 for pattern transfer is raised again preferably to not lower than the glass transition temperature of the resin, and the movable plate 22 is closed to start the next cycle for molding the resin.

Using such equipment, the movable plate 22 is first moved to the stationary plate 21 side to close the mold, and the molten resin is injected into the closed cavity 26 formed by the two plates. The injection molding temperature of the molten resin (resin temperature in the injection cylinder) is generally about 170 to about 300° C. Methyl methacrylate resin is generally molded at a temperature of about 190 to about 270° C. and satisfactory molded bodies can be obtained. In case the molten resin is continuously injected into the mold cavity with rotation of the screw, the number of rotations of the screw is related to the injection rate. As the number of rotations of the screw becomes higher, the injection rate becomes larger. The number of rotations is generally about 20 to about 150 rpm depending on the thickness of molded product. The mold temperature is generally about 30 to about 150° C. As mentioned earlier, it is desirable that the temperature is set at not lower than the glass transition temperature for a period from the injection of the resin to the end of the holding pressure application. The glass transition temperature of methl methacrylate resin is about 105° C. And holding pressure is applied and maintained for a specific period. The medium flowing through the fluid passageways 29, 29 is replaced with the cooling medium by means of a timer, switch valve etc. so that the surface temperature of the mold cavity may be lower than the glass transition temperature at the end of the holding pressure application. After the cooling step, the mold is opened and the cooled molded product is taken out.

Figure 5:
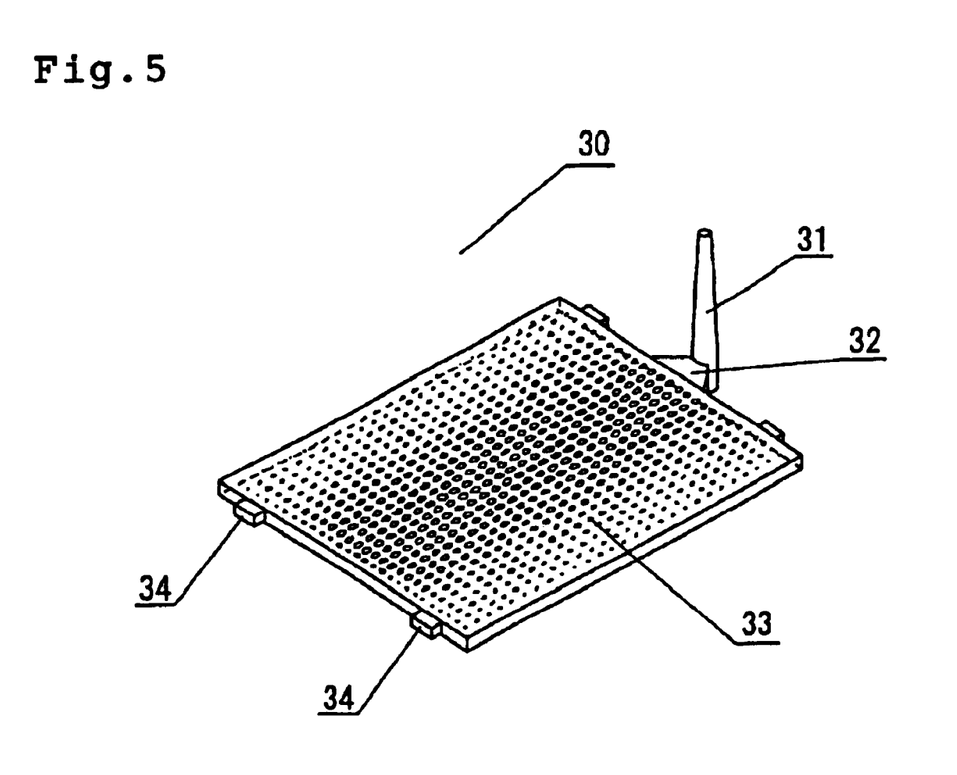
FIG. 5 is a perspective view schematically illustrating a light transmitting plate with a pattern transferred obtained according to the present invention, which is just released from the mold.

FIG. 5 is a schematic perspective diagram showing an example of the light transmitting plate molded by the method of the present invention. A light transmitting plate 30 comprises a sprue 31, a gate 32, a main body 33 of the light transmitting plate and fixing portion-ejection portions 34, 34. The gate 32 is cut off after molding. In this example, a pattern design formed on the cavity plate for pattern transfer is transferred on the surface of the main body 33 of the light transmitting plate on the side of the stationary plate. The pattern is determined by optical simulation. Pattern examples include circle, triangle, square, or dot form, slit groove form, crape crimp form. Any pattern will do as long as it is of a known form having a function of diffusing incident rays. The dot pattern is generally so designed that the dot diameter and dot density increase with increase in distance from the incident side of the light source.

The product (light transmitting plate) thus obtained is excellent in thickness uniformity and peripheral dimension and stable. That is because the molten resin is injected and filled into the mold cavity continuously and very slowly as compared with the ordinary injection molding method, and the resin is filled while the volume shrinkage caused by the cooling of the molten resin is made up for. Because of that, the volume shrinkage is stabilized, and as a result the dimension of the product is stabilized with the deviation in thickness reduced. In case a transparent resin is continuously fed into the mold cavity and molded with rotation of the screw in the cylinder, the resin feeding step and the injection step proceed simultaneously and the holding amount of the molten resin within the injection cylinder is very small as compared with the ordinary injection molding, and therefore the product with a still higher dimensional stability and a high transparency can be obtained. Furthermore, a pattern to be a reflection layer or light-diffusion layer is transferred on at least one side of this molded product, which eliminates the subsequent printing step. This leads to reduction in overall manufacturing costs per a plate of the light transmitting plate as compared with the prior art light transmitting plate now used in the back light unit for large-size liquid crystal display which are made by cutting from a methyl methacrylate resin sheet.

EXAMPLES

To further illustrate the method of the present invention, and not by way of limitation, the following examples are given.

Example 1

Figure 4:
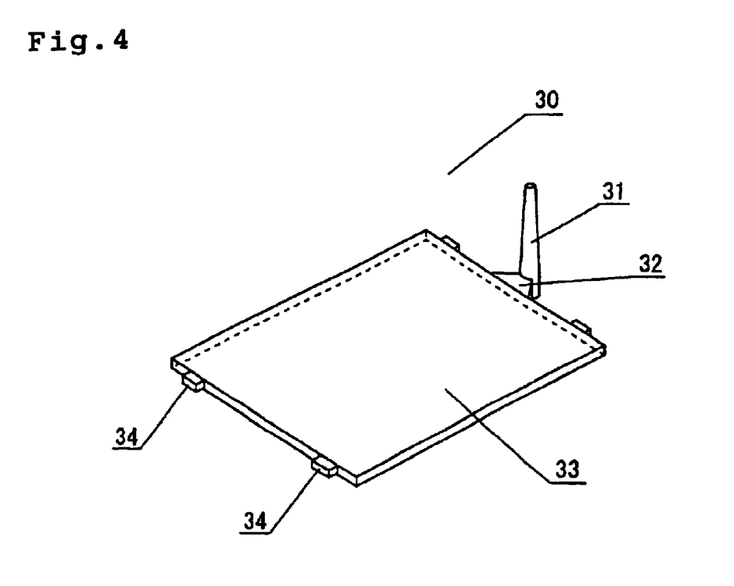
FIG. 4 is a perspective view schematically showing an example of a light transmitting plate obtained according to the present invention, which is just released from the mold.

In this example, a molding equipment "Nestal 200 SYCAP" manufactured by Sumitomo Heavy Industries, Ltd. (Japan) was used. ROM was remodeled to such specifications that the resin was continuously fed into the mold with rotation of the screw in the cylinder and molded. This mold was so designed to be of such a size that it was mounted on a molding equipment with a clamping force of 200 tons and equipped with one cavity. FIG. 4 shows a schematic perspective view of a product molded by this mold. A molded light transmitting plate 30 comprises a sprue 31, a gate 32, a main body 33 of the light transmitting plate and fixing and ejection portions 34, 34. The gate 32 is cut off after molding. The light transmitting plate 33 was so designed as to be 31 cm×24 cm in area and 6 mm in thickness.

The resin used was methyl methacrylate resin "Sumipex MG5" (transparent) made by Sumitomo Chemical Co., Ltd. and the resin temperature in the injection cylinder was set at 235° C. The number of rotation of the screw was 130 rpm. The mold temperature was so set that the cavity surface temperature measured by a surface thermometer will be 90° C. And the molten resin was continuously injected, and when the cavity was filled with the resin, the screw was moved back 10 mm by the pressure of the resin. After the moved back of the screw was finished, holding pressure was immediately applied and that condition was maintained for 40 seconds. After cooling, the mold was opened, and the molded product was taken out. It is noted that the viscosity of the molten resin at the inlet of the mold worked out by the above-mentioned method was 280 Pa·sec and the injection rate of the molten resin was 9.30 cm$^3$/sec.

Five molded products obtained as sample were examined. The thickness deviation in the surface was measured using a dial gauge. The thickness fluctuation was ±0.09 mm. The above procedure was repeated to produce 100 light transmitting plates. The dimensional stability was evaluated by measuring the outer sizes by slide calipers. The outer size fluctuation was ±0.18 mm. According to the standards on methacrylate resin sheet for light transmitting plate, the thickness error is max ±0.1 mm and the outer size deviation is max ±0.2 mm. The measurement results conformed well to the standards. In addition, the 6-mm-thick light transmitting plate obtained was measured with regard to total light transmittance in accordance with JIS K 7105. The total light transmittance was 92%.

Example 2

The same molding equipment "Nestal 200 SYCAP", manufactured by Sumitomo Heavy Industries, Ltd. (Japan) as in Example 1, was used. ROM was remodeled to such specifications that the resin was continuously fed into the mold with rotation of the screw in the cylinder and formed and molded. This mold was so designed to be of such a size that it could be mounted on a molding equipment with a clamping force of 200 tons and equipped with one cavity. The light transmitting plate was close to the one shown in FIG. 5 in shape and it was so designed that the area was 31 cm×24 cm and thickness was 6 mm.

A cavity plate for pattern transfer made of a high thermal conductivity beryllium copper alloy containing 0.5% by weight of beryllium and 1.6% by weight of nickel was pasted on the cavity surface of the stationary plate corresponding to the reflection layer side of a light transmitting plate. Instead of printing, a perfectly round dot pattern had been formed on the cavity plate by etching. In this dot pattern, dots were larger as they got to the median line in the longitudinal direction and were smaller as they were apart from the line. Dots in the center were about 1.0 mm in diameter and the dot-to-dot pitch was about 1.5 mm. Dots in the peripheral part on the light source side were about 0.6 mm and the dot-to-dot pitch was about 1.5 mm. Meanwhile, the cavity surface of the movable plate located on the emission surface layer was plated with nickel on the surface of the same beryllium copper alloy as mentioned above, and in addition, and a mirror-polished cavity plate was put on the surface. To raise or lower the temperature of the mold in the molding cycle, fluid passageways 15 mm in diameter were provided about 9 cm deep from the cavity plate surface of both stationary and movable plates. And the system was so designed as to create cooling and heating cycles by sending out alternately through the passageways cold water at about 30° C. as cooling medium from a unit for cooling medium and compressed water at about 130° C. as heating medium from a temperature regulator unit.

The resin used was methyl methacrylate resin "Sumipex MG5" (transparent) made by Sumitomo Chemical Co., Ltd. and the resin temperature in the injection cylinder was set at 240° C. The number of rotations of the screw was so set that the injection rate of the molten resin, which is expressed in the ratio of the volume of the molded product (=weight/specific gravity) to the filling time from the injection start to holding pressure switchover, was about 8 cm$^3$/sec. The injection rate of the molten resin found after molding was 7.69 cm$^3$/sec. Furthermore, the system was so set that by passing the heating medium through the fluid passageway in the mold, the surface temperature of the cavity to be measured by the surface thermometer was 125° C. The stationary plate and the movable plate were mated to each other, and methyl methacrylate resin was injected into a cavity formed by the two plates. The viscosity of the molten resin at the inlet of the mold worked out by the above-mentioned method was 310 Pa·sec.

When the cavity was filled with the resin, holding pressure was applied. At that moment, the medium in the fluid passageway was replaced with the cooling medium. And the resin was cooled until the temperature of the mold cavity surface was 85° C. after holding pressure application. In that state, the holding pressure was maintained for 40 seconds. Then, the holding pressure was released. The surface temperature of the molded product reached 70° C. in about 70 seconds after the passageway was switched to the cooling medium. After the cooling step, the mold was opened, and the cooled molded product was taken out. Then, heating was started again so that the temperature of the mold cavity surface rose to 125° C., and the mold was closed for the next molding cycle.

Five molded products obtained as sample were examined. The thickness distribution in the surface was measured using a dial gauge. The thickness fluctuation was ±0.09 mm. The above procedure was repeated to produce 100 light transmitting plates. The dimensional stability was evaluated by measuring the outer sizes by slide calipers. The outer size fluctuation was ±0.18 mm. It is said that according to the standards on methyl methacrylate resins for light transmitting plate, the thickness error is max ±0.1 mm, and the outer size error is max ±0.2 mm. The measurement results conformed well to the standards. In addition, the 6-mm-thick light transmitting plate obtained above was measured with regard to total light transmittance in accordance with JIS K 7105. The total light transmittance was 91%. Also, the birefringence of the light transmitting plate was measured by an automatic birefringence meter "KOBRA-CCD/X" manufactured by Oji Measuring Instrument Co., Ltd. The birefringence was $4 \times 10^{-6}$ to $6 \times 10^{-6}$. It is noted that the birefringence is a dimensionless number obtained by dividing the measured optical phase retardation in the thickness direction of the sample by the thickness. The birefringence of the light transmitting plate obtained by the ordinary injection molding method is $10^{-4}$ to $10^{-5}$. The birefringence of methyl methacrylate resin extruded sheet now used for large-size light transmitting plate is on the $10^{-6}$ level. Incidentally, the cast plate is further low in distortion with the birefringence being on the $10^{-7}$ level. Therefore, it was confirmed that the light transmitting plate obtained in this example were as low as the extruded sheet now in use in birefringence and presents no problem.

The pattern transferability was evaluated by measuring the center line mean surface roughness Ra specified under JIS B 0601 using a three-dimensional surface roughness meter made by Tokyo Seimitsu Co., Ltd. The percentage of the transfer obtained was 97 to 100% of the surface roughness of the mold cavity. It was confirmed that the difference in the percentage of the transfer among the different points on the surface of the molded product was very small and when the plate was mounted in the back light unit, the luminance distribution was no problem. Furthermore, after the pattern was transferred, the light transmitting plate was left for 5 hours in an oven at 85° C. Then the retention of the pattern was measured similarly. It was recognized that the surface roughness decreased only 2 to 3% presented no problem. As shown, the reflection layer pattern as a substitute for printing was transferred accurately and uniformly.

The same procedure, except that the injection rate of the molten resin was varied by changing the number of rotations of the screw, was performed to examine the presence of sink marks (sunk areas caused by volume shrinkage), presence of short shot (areas where the resin failed to reach), or presence of flow marks (flowing marks on the surface). The results are shown in Table 1 with satisfactory results indicated by ◯ mark and results including slightly sink marks, short shot or flow marks indicated by Δ.

TABLE 1

| Resin temperature (° C.) | Filling time (sec) | Weight (g) | Injection rate * (cm$^3$/sec) | Viscosity at inlet (Pa·sec) | Appearance observation results | | |
|---|---|---|---|---|---|---|---|
| | | | | | Sink marks | Short shot | Flow marks |
| 240 | 130 | 490 | 3.17 | 560 | ◯ | Δ | Δ |
| 240 | 102 | 506 | 4.17 | 500 | ◯ | ◯ | ◯ |
| 240 | 83 | 513 | 5.19 | 440 | ◯ | ◯ | ◯ |
| 240 | 60 | 549 | 7.69 | 310 | ◯ | ◯ | ◯ |
| 240 | 41 | 556 | 11.40 | 240 | ◯ | ◯ | ◯ |
| 240 | 30 | 558 | 15.6 | 190 | Δ | ◯ | ◯ |

* Weight was converted into volume on the basis of the specific gravity (1.19) of methylmethacrylate resin, and the volume (cm$^3$) was divided by filling time (sec) to find the injection rate of the molten resin.

Example 3

Using the same equipment and the resin as in Example 2, an experiment was carried out under the following conditions. That is, the temperature of the resin in the injection cylinder was set at 235° C. and the number of rotations of the screw was set at 90 rpm. The equipment was so set that by passing the heating medium through the fluid passageway in the mold, the cavity surface temperature to be measured by surface thermometer was 125° C. The stationary plate mated to the movable plate, methyl methacrylate resin was injected into a cavity formed by the two plates. When the cavity was filled with the resin, the screw was moved back about 10 mm by the resin pressure, and after the moved back of the screw was finished, holding pressure immediately was applied. At that moment, the medium in the liquid passageways was replaced with the cooling medium so that the temperature of the mold cavity surface was 85° C. when holding pressure application ended. After the holding pressure was maintained for more 30 seconds, the holding pressure was released. The surface temperature of the molded product reached 70° C. within about 60 seconds after the liquid passageway was switched to the cooling medium. After cooling, the mold was opened to take out the cooled product. Then, heating was started again so that the temperature of the mold cavity surface rose to 125° C., and the mold was closed for the next molding cycle. It is noted that the viscosity of the molten resin at the inlet of the mold worked out by the above-mentioned method was 490 Pa·sec and the injection rate of the molten resin was 5.5 cm$^3$/sec.

Five molded product samples obtained were examined. The thickness distribution in the surface was measured using a dial gauge. The thickness fluctuation was ±0.07 mm. The above procedure was repeated until 100 light transmitting plate samples had been obtained. The dimensional stability was evaluated by measuring the outer sizes by slide calipers. The outer size fluctuation was ±0.16 mm. Furthermore, the total light transmittance was 92%, and the birefringence was $4 \times 10^{-6}$ to $6 \times 10^{-6}$. As in Example 2, the pattern transferability was evaluated. The percentage transfer obtained was 99 to 100% of the surface roughness of the mold cavity. It was recognized that the difference in the percentage of the transfer among the different points on the surface of the molded product was very small and when the plate was mounted in the background light unit, the luminance distribution was satisfactory. In addition, after the pattern was transferred, the light transmitting plate was heated for 5 hours in an oven at 85° C. Then the retention of the pattern was measured the same way. It was confirmed that the surface roughness eliminated only 1 to 2% and was no problem. As shown, the reflection layer pattern as substitute for desired printing was transferred accurately and uniformly. The subsequent printing step could be omitted. This leads to reduction in overall manufacturing costs per plate as compared with the prior art light transmitting plate now used in the background light unit for large-size liquid crystal display, which are made by cutting from a methyl methacrylate resin sheet.

What is claimed is:

1. A method for producing a light transmitting plate, comprising the steps of:
   using a molding equipment composed of an injection equipment and a mold for producing a light transmitting plate wherein a cavity of the mold communicates with a cylinder in the injection equipment;
   feeding a transparent resin into the cylinder;
   melting the transparent resin in the cylinder; and
   injecting the molten resin into the cavity of the mold from the cylinder;
   wherein a viscosity of the molten resin at the inlet of the mold is about 50 to about 5,000 Pa·sec and an injection rate of the molten resin is about 1 to about 15 cm$^3$/sec.

2. The method for producing a light transmitting plate according to claim 1, wherein the molten resin is continuously filled into the mold cavity with rotation of a screw in the cylinder.

3. The method for producing a light transmitting plate according to claim 1, wherein the molten resin is continuously filled into the mold cavity with progression of a screw with no rotation in the cylinder.

4. The method for producing a light transmitting plate according to claim 1, wherein the transparent resin is a methyl methacrylate resin.

5. The method for producing a light transmitting plate according to claim 1 or 2, wherein the injection rate of the molten resin is about 4 to about 11 cm$^3$/sec.

6. The method for producing a light transmitting plate according to claim 1, wherein a diagonal length of the light transmitting plate is not smaller than 14 inches.

7. The method for producing a light transmitting plate according to claim 1, wherein an engraved pattern is provided on at least one surface of the mold cavity and a light transmitting plate obtained has a pattern based on the engraved pattern of the mold formed on at least one side thereof.

8. The method for producing a light transmitting plate according to claim 7, wherein the pattern to be formed is a reflection layer pattern to be provided on the backside of the light transmitting plate.

9. The method for producing a light transmitting plate according to claim 7, wherein the pattern to be formed is a light diffusion layer pattern to be provided on the light emission side of the light transmitting plate.

10. The method for producing a light transmitting plate according to claim 7, wherein one pattern to be formed is a reflection layer pattern to be provided on the back side of the light transmitting plate and another pattern to be formed is a light diffusion layer pattern to be provided on the light emission side of the light transmitting plate.

11. The method for producing a light transmitting plate according to claim 7, wherein the engraved pattern is formed on a cavity plate provided on the surface of the mold.

12. The method for producing a light transmitting plate according to claim 11, wherein the cavity plate is made of a metal with a higher thermal conductivity than that of the metal forming the mold.

13. The method for producing a light transmitting plate according to claim 7, wherein the engraved pattern is formed on a metal plate provided on a cavity plate which has not the engraved pattern, is made of a metal with a higher thermal conductivity than that of the metal forming the mold and is provided on the surface of the mold.

14. The method for producing a light transmitting plate according to claim 12 or 13, wherein the metal with a higher thermal conductivity than that of the metal forming the mold is beryllium copper alloy.

15. The method for producing a light transmitting plate according to claim 1 or 2, wherein the transparent resin is injected into the cavity with the temperature of the mold cavity surface being not lower than the glass transition temperature of the transparent resin, and after injecting the temperature of the cavity surface is lowered to not higher than the glass transition temperature of the transparent resin.

16. The method for producing a light transmitting plate according to claim 1, wherein fluid passageways are provided in the mold wall and near the mold cavity surface and a heating medium and a cooling medium are allowed to flow through the fluid passageways alternately thereby regulating the temperature of the transparent resin filled in the cavity.

* * * * *